(12) United States Patent
Sugano et al.

(10) Patent No.: US 7,584,017 B2
(45) Date of Patent: Sep. 1, 2009

(54) ARTICLE TRANSPORT APPARATUS

(75) Inventors: Shigeru Sugano, Komaki (JP); Fumiaki Tatemi, Gifu-ken (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 11/202,947

(22) Filed: Aug. 12, 2005

(65) Prior Publication Data
US 2006/0062656 A1  Mar. 23, 2006

(30) Foreign Application Priority Data
Aug. 18, 2004  (JP)  ............................. 2004-238411

(51) Int. Cl.
G07F 7/00 (2006.01)
B65G 47/10 (2006.01)
B65G 47/46 (2006.01)
(52) U.S. Cl. .................. 700/228; 700/213; 198/370.03
(58) Field of Classification Search .................. 700/213, 700/214, 229, 219, 226, 230, 228; 198/370.03, 198/346.1, 465.1, 370.01
See application file for complete search history.

(56) References Cited
U.S. PATENT DOCUMENTS

| | | | | |
|---|---|---|---|---|
| 5,509,538 A | * | 4/1996 | Spindler et al. ............. | 209/630 |
| 5,819,189 A | * | 10/1998 | Kramer et al. ................ | 701/22 |
| 6,580,955 B2 | * | 6/2003 | Lin et al. ....................... | 700/97 |
| 6,721,627 B2 | * | 4/2004 | Udou et al. .................. | 700/228 |
| 6,745,102 B1 | * | 6/2004 | Liu .............................. | 700/228 |
| 6,745,454 B1 | * | 6/2004 | Grimshaw et al. ............ | 29/563 |
| 6,757,590 B2 | * | 6/2004 | Ross et al. ................... | 700/286 |
| 7,014,033 B2 | * | 3/2006 | Sticht et al. ............... | 198/465.1 |

FOREIGN PATENT DOCUMENTS

| | | |
|---|---|---|
| JP | 58167307 | 10/1983 |
| JP | 63155308 | 6/1988 |
| JP | 64075304 | 3/1989 |
| JP | 2002-175117 | 6/2002 |

* cited by examiner

*Primary Examiner*—Gene Crawford
*Assistant Examiner*—Ramya Prakasam
(74) *Attorney, Agent, or Firm*—The Webb Law Firm

(57) ABSTRACT

An article transport apparatus has a path that has a first end and a second end and that extends along a plurality of article transferring locations, a plurality of article transporting vehicles that run on the path, and control means for controlling the plurality of article transporting vehicles. When the transport request data currently processed and the transport request data previously processed specify a same article transferring location for collecting, and the article transporting vehicle that was selected based on the transport request data previously processed is currently performing a transport operation, then the control means selects an article transporting vehicle that is not currently performing a transport operation as the article transporting vehicle for a transport operation.

16 Claims, 6 Drawing Sheets

ARTICLE TRANSPORT APPARATUS

BACKGROUND OF THE INVENTION

Article transport apparatuses are known in which control means selects an article transporting vehicle for a transport operation, from among a plurality of article transporting vehicles, based on transport request data that specify an article transferring location for collecting and an article transferring location for delivering from among a plurality of article transferring locations, and then runs the article transporting vehicle that has been selected for the transport operation to the article transferring location for collecting and to the article transferring location for delivering.

Such article transport apparatuses are employed in automated warehouse, for example. The control means selects an article transporting vehicle for a transport operation based on transport request data that are processed in sequence, and then runs the article transporting vehicle selected for the transport operation to an article transferring location for collecting and to an article transferring location for delivering, transporting articles between a plurality of article transferring locations by repeatedly performing a transport operation to transport an article from an article transferring location for collecting to an article transferring location for delivering using any one of the plurality of article transporting vehicles each time transport request data are processed.

Some such article transport apparatuses are provided with two article transporting vehicles and are designed such that the control means controls the operation of the two article transporting vehicles while preventing a collision between them (see JP 2002-175117A, for example).

As in the article transport apparatus detailed in the above patent document, conventionally, control means serves as the mechanism for selecting an article transporting vehicle for a transport operation from among the two article transporting vehicles based on transport request data, and here the control means selects the article transporting vehicle, of the two article transporting vehicles, that is positioned nearer the article transferring location for collecting as the article transporting vehicle for the transport operation.

More specifically, as shown in FIG. 1, a plurality of stations 1 serving as article transferring locations are provided in the lengthwise direction of a path 2 with a spacing between them, and two article handling vehicles 3, that is, a first article handling vehicle 3a and a second article handling vehicle 3b, are provided as article transporting vehicles.

The plurality of stations 1 include a combination of delivery stations 1a provided with a delivery conveyer for transporting articles 20 that are to be delivered from article storage racks 19 of an automated storage facility, stocking stations 1b provided with a stocking conveyer for transporting the articles 20 that are to be stocked in the article storage racks 19 of the automated storage facility, reception stations 1c provided with a reception conveyer for transporting the articles 20 that are to be received from the outside, shipping stations 1d provided with a shipping conveyer for transporting the articles 20 that are to be shipped to the outside, and processing stations 1e for performing processing such as stacking or picking up the articles 20.

The control means for controlling the operation of the two article handling vehicles 3 is configured so as to select the article handling vehicle 3, of the two article transporting vehicles 3, that is positioned closer to the station for collection 1 as the article transporting vehicle 3 for the transport operation, based on the transport request data.

In the conventional article transport apparatus described above, the control means selects the article handling vehicle 3, of the two article transporting vehicles 3, that is located closer to the station for collection 1 as the article transporting vehicle 3 for the transport operation when transport request data are processed, and thus the same article transporting vehicle may be repeatedly selected as the article transporting vehicle for a transport operation.

Accordingly, there is a possibility that the transport operation can be performed by only some article transporting vehicles, even through a plurality of article transporting vehicles have been provided, and this may keep the transport capacity from being improved.

Further description is made using FIG. 1. For example, there is a period during which the task of stocking the articles 20 that have been delivered from the outside into the article storage racks 19 of the automated storage facility is concentrated, and during this period, the transport request data processed for the current transport operation and the transport request data processed for the previous transport operation will specify the same reception station 1c as the station for collection.

The reception station 1c is disposed closer to the second article handling vehicle 3b than the first article handling vehicle 3a, and thus when the control means selects the article handling vehicle that is positioned closer to the station for collection than the other article transporting vehicle as the article transporting vehicle for the transport operation, the second article handling vehicle 3b is repeatedly selected as the article transporting vehicle for the transport operation.

Accordingly, the transport operation is repeatedly performed using the second article handling vehicle 3b, and because only the second article handling vehicle 3b, of the first article handling vehicle 3a and the second article handling vehicle 3b, can be used to perform the transport operation, the transport capacity cannot be increased.

SUMMARY OF THE INVENTION

It is an object of the present invention to provide an article transport apparatus whose transport capacity has been improved over that of conventional transport apparatuses.

An article transport apparatus in accordance with the invention comprises a path that has a first end and a second end and that extends along a plurality of article transferring locations; a plurality of article transporting vehicles that run on the path; and control means for controlling the plurality of article transporting vehicles wherein the control means selects an article transporting vehicle for a transport operation from among the plurality of the article transporting vehicles based on transport request data which specifies an article transferring location for collecting and an article transferring location for delivering from among the plurality of article transferring locations, and runs the selected article transporting vehicle for the transport operation to the article transferring location for collecting and to the article transferring location for delivering, and wherein when the transport request data currently processed and the transport request data previously processed specify a same article transferring location for collecting, and the article transporting vehicle that was selected based on the transport request data previously processed is currently performing a transport operation, then the control means selects an article transporting vehicle that is not currently performing a transport operation as the article transporting vehicle for a transport operation.

That is, this means that when the transport request data currently processed and the transport request data previously processed specify a same article transferring location for collecting, and the article transporting vehicle that was selected based on the transport request data previously processed is currently performing a transport operation, then the control means can select an article transporting vehicle that is different from the article transporting vehicle performing the transport operation, which was selected based on the transport request data previously processed, as the article transporting vehicle for the transport operation.

By the control means selecting an article transporting vehicle that is different from the article transporting vehicle performing the transport operation, which was selected based on the transport request data previously processed, as the article transporting vehicle for the transport operation, it is possible for both article transporting vehicles, namely the article transporting vehicle that was selected based on the transport request data previously processed and the article transporting vehicle selected based on the transport request data currently processed, to perform a transport operation.

Accordingly, a plurality of article transporting vehicles can be employed to repeatedly perform the transport operation, and thus it is possible to provide an article transporting apparatus with which an increase in transport capacity can be achieved.

DETAILED DESCRIPTION OF THE PREFERRED EMBODIMENTS

Embodiments of an article transport apparatus according to the present invention are described with reference to the drawings.

Figure 1:
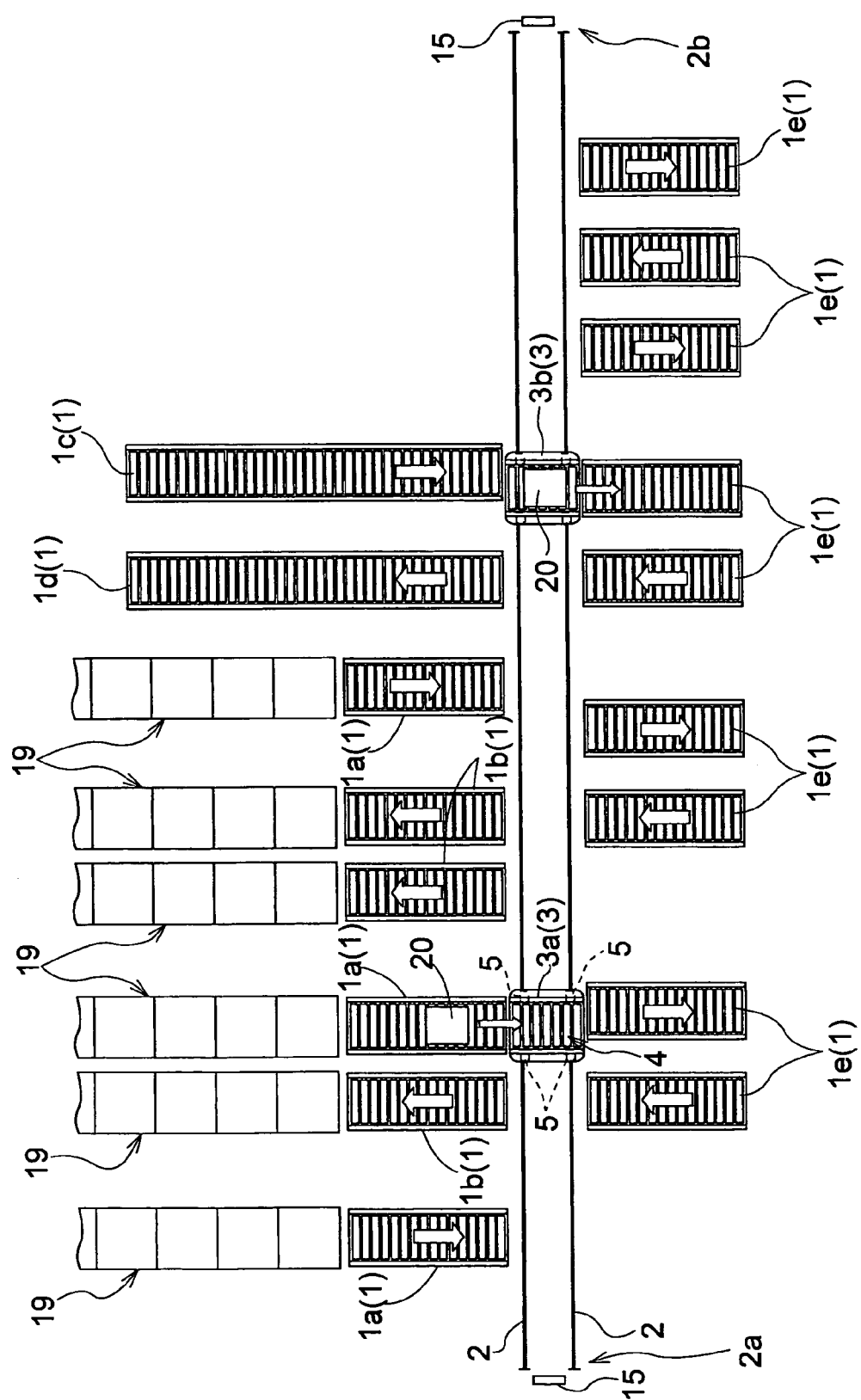
FIG. 1 is a plan view of an article transport apparatus.

As shown in FIG. 1, the article transport apparatus is adopted for an automated storage facility provided with article storage racks 19, for example. It is provided with a plurality of article handling vehicles 3 serving as article transporting vehicles that run over a path 2 that spans a plurality of stations 1 serving as article transferring locations, and is configured such that the plurality of article handling vehicles 3 run back and forth over the path 2 to transport articles 20 between the plurality of stations 1.

The path 2 extends in a straight line and has a first end 2a and a second end 2b. A plurality of stations 1 are arranged on both sides of and along the path 2 with spacing between them in the lengthwise direction of the path 2.

The plurality of stations 1 include a combination of delivery stations 1a provided with a delivery conveyer for transporting articles 20 that are to be delivered from article storage racks 19 of an automated storage facility, stocking stations 1b provided with a stocking conveyer for transporting the articles 20 that are to be stocked in the article storage racks 19 of the automated storage facility, reception stations 1c provided with a reception conveyer for transporting the articles 20 that are to be received from the outside, shipping stations 1d provided with a shipping conveyer for transporting the articles 20 that are to be shipped to the outside, and processing stations 1e for performing processing such as stacking or picking up the articles 20.

It should be noted that although not shown, the article storage rack 19 is provided with a plurality of article storage portions in the vertical direction and the horizontal direction, and the plurality of article storage racks 19 are provided at locations corresponding to the unloading station 1a and the loading station 1b, in a spaced relationship such that they are parallel to each other.

Although not shown, stacker cranes for transporting articles 20 between the article storage rack 19 and the unloading station 1a, and between the loading station 1b and the article storage rack 19, are provided in the area between article storage racks 19.

A first article handling vehicle 3a and a second article handling vehicle 3b are provided as the two article handling vehicles 3, and the first article handling vehicle 3a and the second article handling vehicle 3b are each provided with an electrically powered transfer device 4, such as a roller conveyer, for transferring articles 20 to and from the station 1, and a plurality of running wheels 5 that run over a pair of rails disposed along the path 2. A power supply wire extends along the path 2 and the article handling vehicles 3a, 3b receive electrical power from the wire.

The running wheels 5 are made of a driving running wheel 5 that is rotatively driven by an inverter-type travel motor 6 and a driven running wheel 5 that can be rotatively driven.

Figure 2:
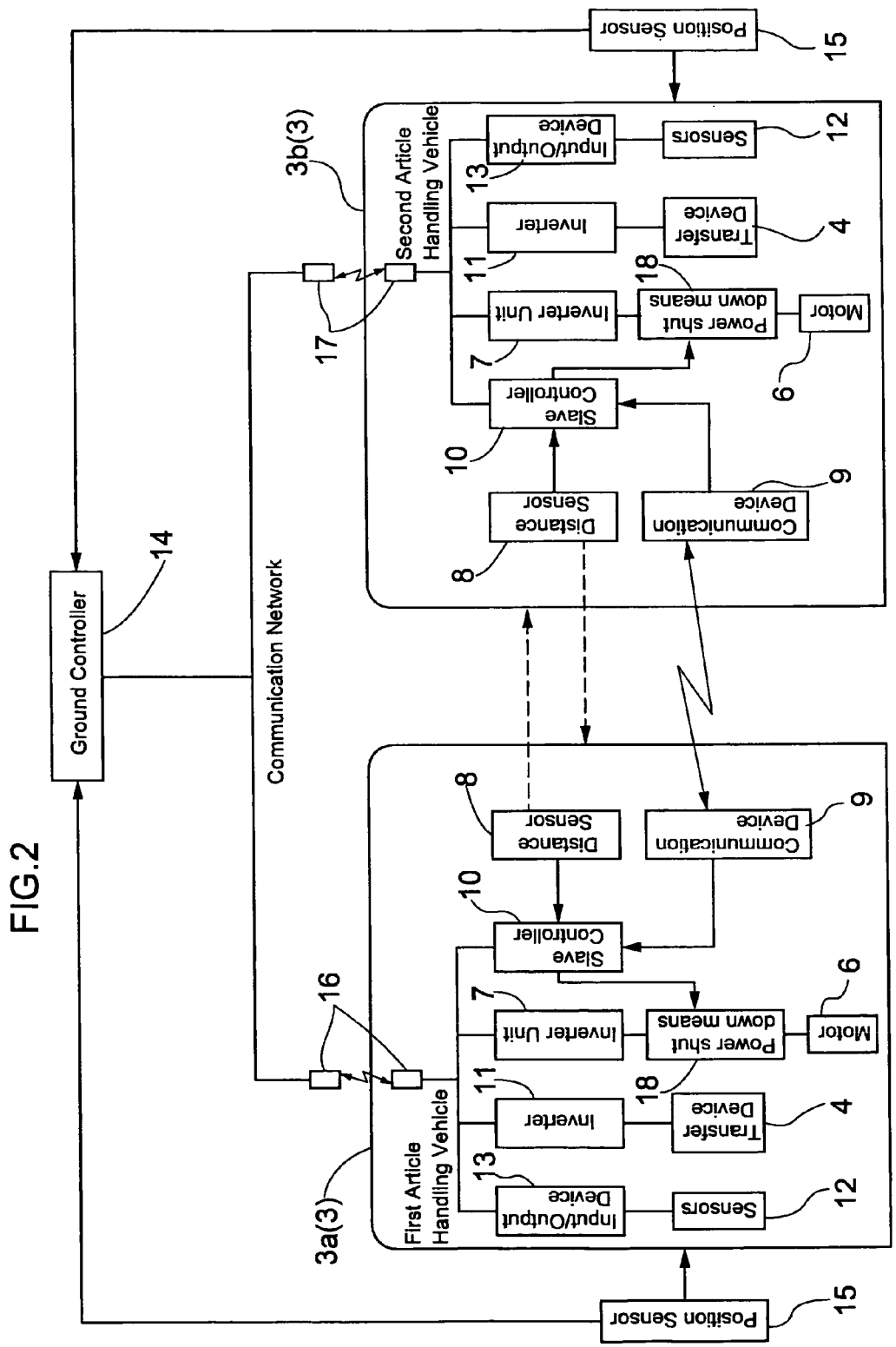
FIG. 2 is a block diagram of the article transport apparatus.

As shown in FIG. 2, the first article handling vehicle 3a and the second article handling vehicle 3b are each provided with a travel inverter unit 7 for operating the travel motor 6 to movingly drive the article handling vehicle 3, a vehicle distance sensor 8 for detecting the distance to the other article handling vehicle 3, a vehicle-to-vehicle optical transmission device 9 for communicating information with the other article handling vehicle 3, a slave controller 10 for controlling the operation of the vehicle distance sensor 8 and the optical transmission device 9, for example, a transfer inverter 11 for operating the transfer device 4, sensors 12 for detecting the state of the article 20 in the transfer device 4, for example, and an input-output device 13 for outputting information detected by the sensors 12.

A single ground-side controller 14 is provided on the ground (for example, the floor) as control means for controlling operation of the first article handling vehicle 3a and the second article handling vehicle 3b, and the ground-side controller 14 controls the operation of the travel inverter unit 7 and the transfer inverter 11 of the first article handling vehicle 3a and of the second article handling vehicle 3b.

Each end area of the path 2 is provided with a position detection sensor 15 that obtains necessary to determine the position of the corresponding article handling vehicle 3 on the path 2 by detecting the distance from that end to the article handling vehicle 3. A laser distance sensor may be used as a position detection sensor 15 and other sensors mentioned in the specification, while other conventional sensors utilizing sound or electromagnetic field to detect information or data necessary to determine the position of the object may be used. For example, a sensor with an emitter for emitting sound or electromagnetic field and a receiver that receives bounced signal form a reflector mounted on an object for reflecting sound or electromagnetic wave may be used.

Although not shown, the ground-side controller 14 provided on the ground-side, and each of the travel inverter units 7, the slave controllers 10, the transfer inverters 11, and the input-output devices 13 provided in the article handling vehicles 3 are provided with a communication controller.

More specifically each of the travel inverter units 7 has, in addition to an inverter, an inverter communication controller for controlling the inverter. A first optical transmission device 16 for sending and receiving information between the ground-side controller 14 and the first article handling vehicle 3a and a second optical transmission device 17 for sending and receiving information between the ground-side controller 14 and the second article handling vehicle 3b are provided.

The communication controller provided on the ground-side controller 14, the communication controllers provided on the article handling vehicles 3, the first optical transmission device 16 and the second optical transmission device 17 together make up a communication network known as a "device network." The ground-side controller 14 functions as a master, and the travel inverter units 7, the slave controllers 10, the transfer inverters 11 and the input-output devices 13 function as slaves.

The information detected by the position detection sensors 15 provided at both end areas of the path 2 is input into the ground-side controller 14, and the ground-side controller 14 controls the positions of the first article handling vehicle 3a and the second article handling vehicle 3b on the path 2 based on the information detected by the position detection sensors 15.

In this manner, the ground-side controller 14 controls operation of the first article handling vehicle 3a and the second article handling vehicle 3b by giving various command information to the first article handling vehicle 3a and the second article handling vehicle 3b via the communication network while controlling the positions of the first article handling vehicle 3a and the second article handling vehicle 3b on the path 2.

The ground-side controller 14 controls the operation of the two article handling vehicles 3 so as to transport an article 20 from a station for collection to a station for delivery using either one of the first article handling vehicle 3a and the second article handling vehicle 3b, based on transport request data that specify a station for collection and a station for delivery from, among the plurality of stations 1.

To further describe the configuration through which the ground-side controller 14 operates the two article handling vehicles 3, the ground-side controller 14 performs a selection process to select an article handling vehicle 3 for a transport operation from the first article handling vehicle 3a and the second article handling vehicle 3b based on the transport request data, and then performs a transport operation to transport the article 20 from the station for collection to the station for delivery by running the article handling vehicle 3 for the transport operation that has been selected in the selection process to the station for collection to retrieve the article 20 from the station for collection, and then running the article handling vehicle 3 to the station for delivery to unload the article 20 to the station for delivery.

The transport request data can be input to the ground-side controller 14 through a manually operated input device such as a keyboard or through a host computer, for example. For example, transport request data include data that specify a station for collection from which the article 20 is to be retrieved, and a station for delivery to which the article 20 is to be unloaded.

To describe the selection process more specifically, the ground-side controller 14 is configured so as to select an article handling vehicle 3 for a transport operation from the first article handling vehicle 3a and the second article handling vehicle 3b, based on various conditions such as whether or not the first article handling vehicle 3a or the second article handling vehicle 3b are currently performing transport, the positions of the first article handling vehicle 3a and the second article handling vehicle 3b on the path 2, and which station 1 is the station for collection in the transport request data.

More specifically, the ground-side controller 14 is configured so as to select the article handling vehicle 3 positioned closer to the station for collection, of the two article handling vehicles 3, as the article handling vehicle 3 for the transport operation when the station for collection in the transport request data currently processed is different from the station for collection in the transport request data previously processed, or when transport request data are processed in a state in which there is no article handling vehicle 3 currently performing transport.

Figure 3:
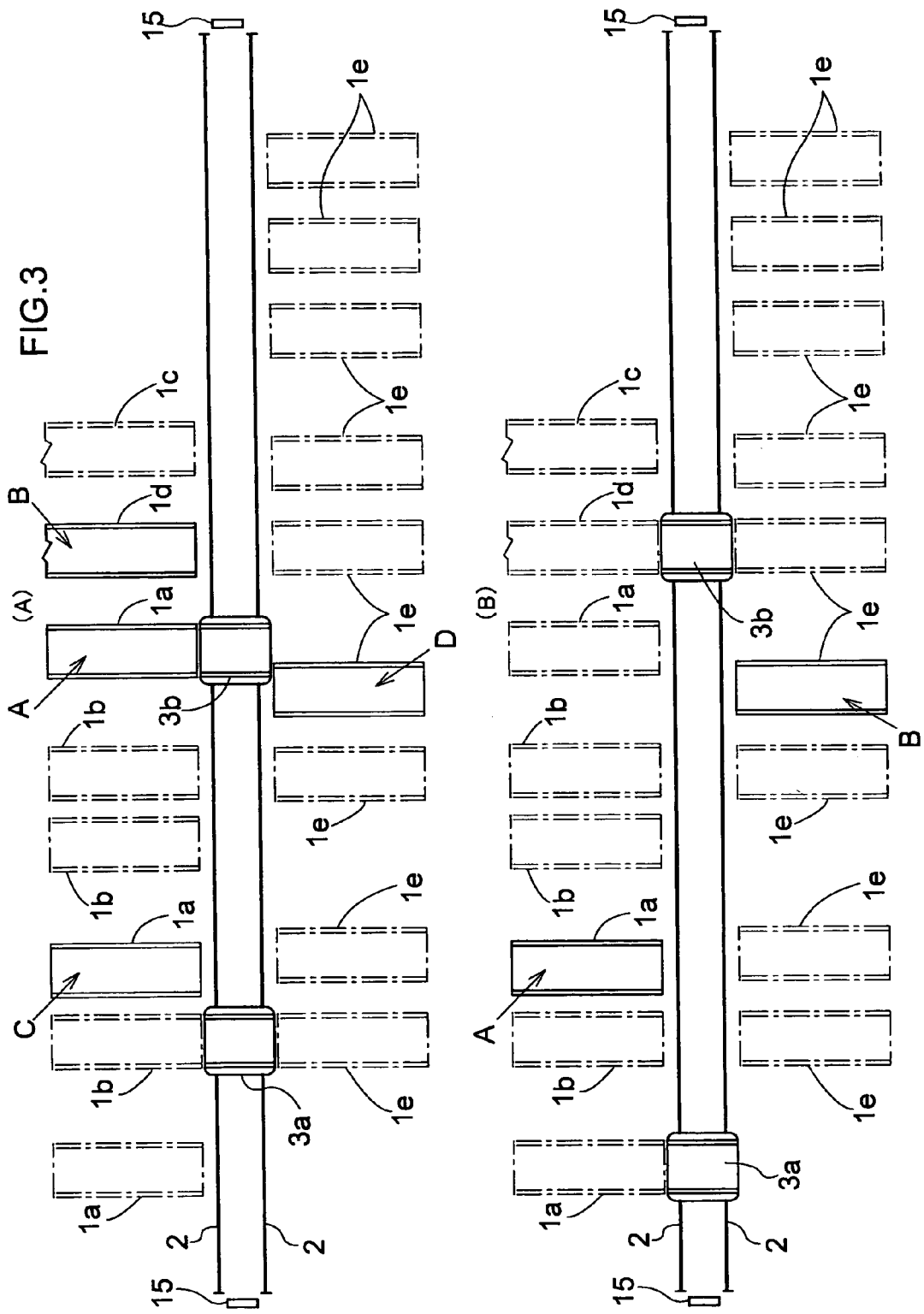
FIG. 3 is a partially omitted plan view of the article transport apparatus.

The description is continued based on FIG. 3. FIG. 3A shows a state in which transport request data that specify a station for collection C and a station for delivery D have been processed while the second article handling vehicle 3b is performing transport from a station for collection A to a station for delivery B based on the transport request data previously processed.

FIG. 3B shows a state in which transport request data that specify a station for collection A and a station for delivery B have been processed when neither the first article handling vehicle 3a or the second article handling vehicle 3b are performing a transport operation.

The ground-side controller 14, as shown in FIG. 3A, selects the first article handling vehicle 3a positioned near the station for collection C according to the transport request data currently processed as the article handling vehicle 3 for transport because the station for collection A according to the transport request data previously processed is different from the station for collection C according to the transport request data currently processed.

As shown in FIG. 3B, when transport request data are processed at a time when there is no article handling vehicle 3 currently performing a transport operation, the ground-side controller 14 selects the first article handling vehicle 3a positioned near the station for collection A according to the transport request data currently processed as the article handling vehicle 3 for the transport operation.

When the station for collection of the transport request data currently processed is the same as the station for collection in the transport request data previously processed, and when the article handling vehicle 3 selected based on the transport request data previously processed is currently performing transport, then the ground-side controller 14 selects the remaining article handling vehicle 3 that is not currently performing a transport operation as the article transporting vehicle 3 for transport.

Figure 4:
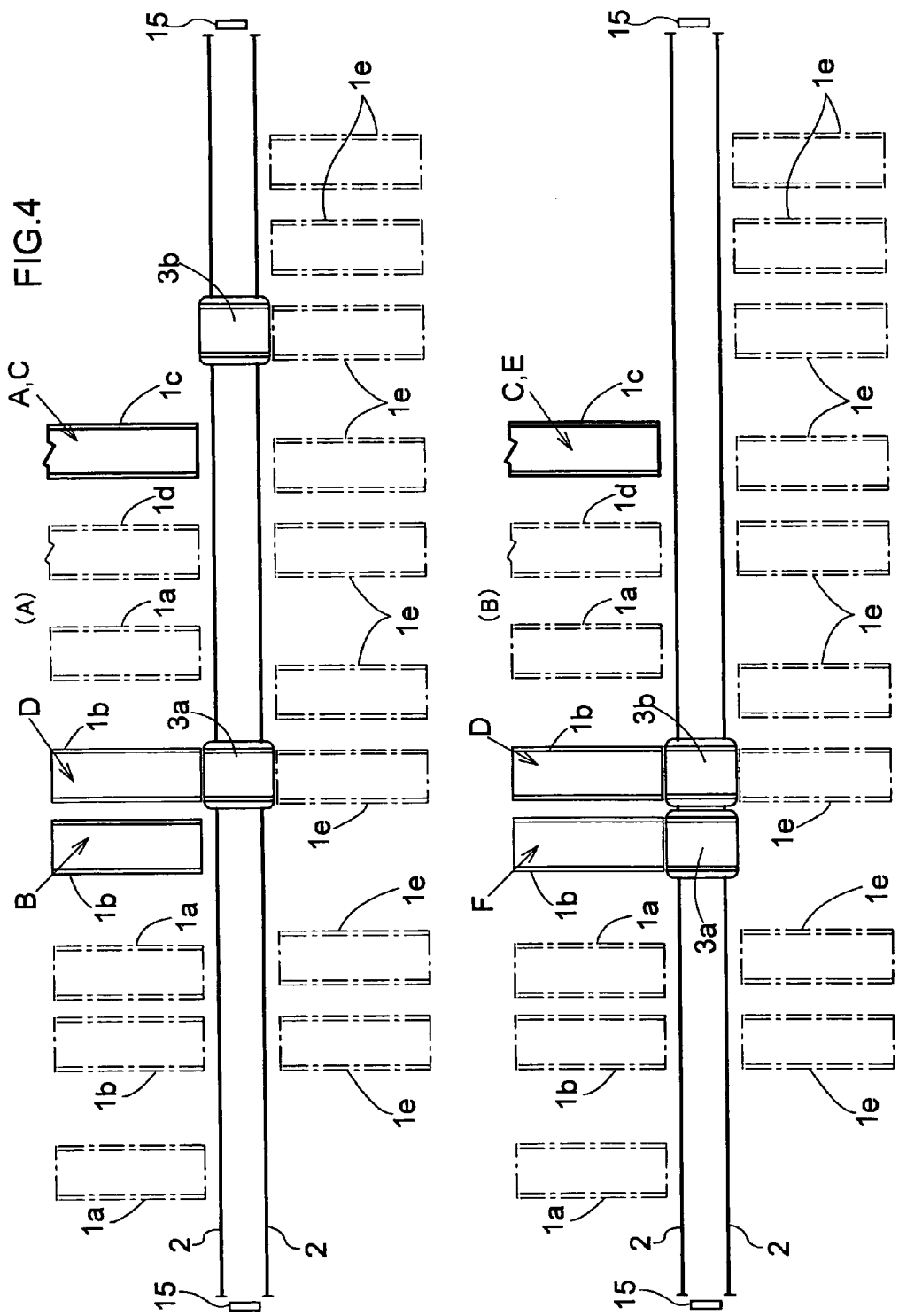
FIG. 4 is a partially omitted plan view of the article transport apparatus.
Figure 5:
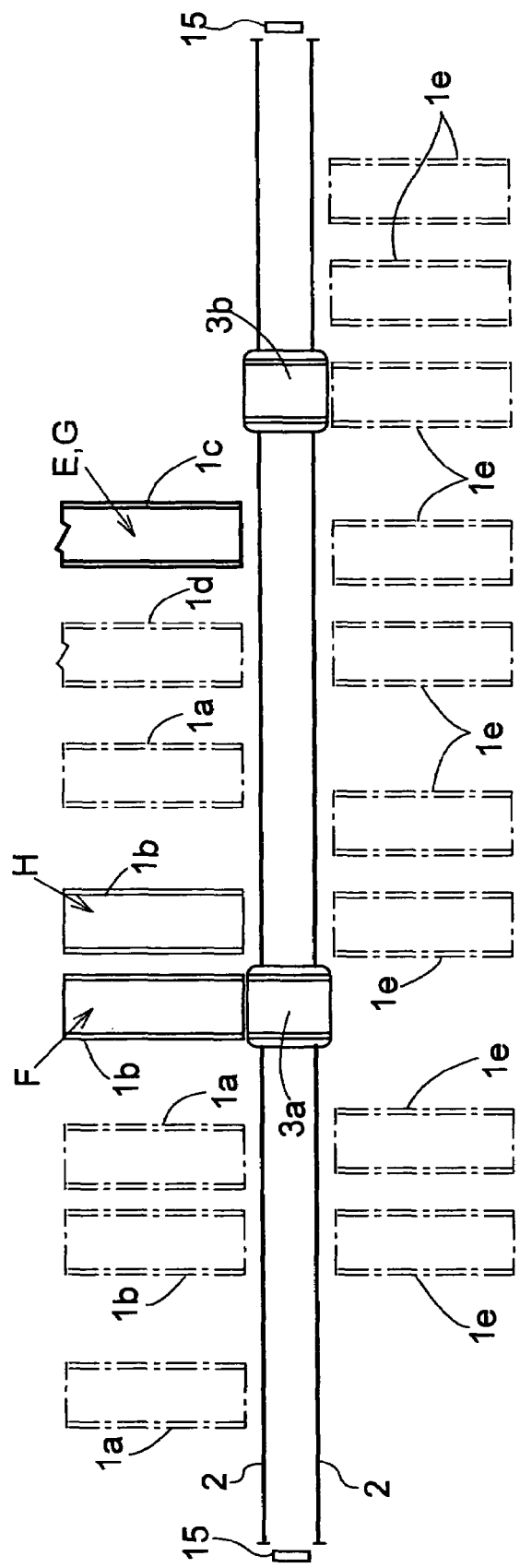
FIG. 5 is a partially omitted plan view of the article transport apparatus.

Further description is made using FIGS. 4 and 5. FIG. 4A shows a state in which transport request data specifying a station for collection C and a station for delivery D are processed while the first article handling vehicle 3a is performing transport from a station for collection A to a station for delivery B based on the transport request data previously processed.

FIG. 4B shows a state in which transport request data specifying a station for collection E and a station for delivery F have been processed at a time when the second article handling vehicle 3b is performing a transport operation from the station for collection C to the station for delivery D after the transport operation by the first article handling vehicle 3a shown in FIG. 4A has finished.

FIG. 5 shows a state in which transport request data specifying a station for collection G and a station for delivery H are processed at a time when the first article handling vehicle 3a is performing transport from the station for collection E to the station for delivery F; after the transport operation by the second article handling vehicle 3b shown in FIG. 4B has finished.

As in FIG. 4A, when the station for collection A according to the transport request data previously processed is the same as the station for collection C according to the transport request data currently processed, and the first article handling vehicle 3a is currently performing transport from the station for collection A to the station for delivery B, then the ground-side controller 14 selects the remaining second article handling vehicle 3b, which is not currently performing a transport operation, as the article transporting vehicle 3 for transport.

As in FIG. 4B, when the station for collection C according to the transport request data previously processed is the same as the station for collection E according to the transport request data currently processed, and the second article handling vehicle 3b is currently performing a transport operation from the station for collection C to the station for delivery D, then when the next transport request data are processed, the ground-side controller 14 selects the remaining first article handling vehicle 3a, which is not currently performing a transport operation, as the article transporting vehicle 3 for transport.

Further, as in FIG. 5, when the station for collection E according to the transport request data previously processed is the same as the station for collection G according to the transport request data currently processed, and the first article handling vehicle 3a is currently performing transport from the station for collection E to the station for delivery F, then when new transport request data are next processed, the ground-side controller 14 selects the remaining second article handling vehicle 3b, which is not currently performing a transport operation, as the article transporting vehicle 3 for transport.

In this way, when the station for collection according to the transport request data previously processed remains the same as the station for collection according to the transport request data currently processed, and the article handling vehicle 3 that has been selected based on the transport request data previously processed continues to perform a transport operation, then the ground-side controller 14 alternately selects the first article handling vehicle 3a and the second article handling vehicle 3b as the article transporting vehicle 3 for transport.

For example, during a period in which the task of stocking articles 20 that have been shipped in from the outside to the article storage racks 19 is concentrated, transport request data specifying the reception station 1c as the station for collection is repeatedly processed, and in such a case, the station for collection according to the transport request data previously processed remains the same as the station for collection according to the transport request data currently processed and the article handling vehicle 3 that has been selected based on the transport request data previously processed continues to perform the transport operation.

Accordingly, for example, during a period in which the task of stocking articles 20 that have been received from the outside to the article storage racks 19 is concentrated, the first article handling vehicle 3a and the second article handling vehicle 3b are alternately selected as the article transporting vehicle 3 for the transport operation so that the transport operation can be repeatedly performed utilizing the first article handling vehicle 3a and the second article handling vehicle 3b, and thus it is possible to achieve an increase in transport capacity and an improved efficiency with which the task is performed.

Further, as mentioned above, in a period in which the task of stocking articles 20 that have been received from the outside to the article storage racks 19 is concentrated, it is possible that transport request data processed is such that the station for collection according to the transport request data previously processed is different from the station for collection according to the transport request data currently processed, thus differentiating the task of transporting to the article storage racks 19 the article 20 that has been transported to the station for delivery based on the transport request data previously processed, and the task of transporting to the article storage racks 19 the article 20 that has been transported to the station for delivery based on the transport request data currently processed, and thus both tasks can be performed at the same time, thereby allowing a further increase in efficiency to be achieved.

Figure 6:
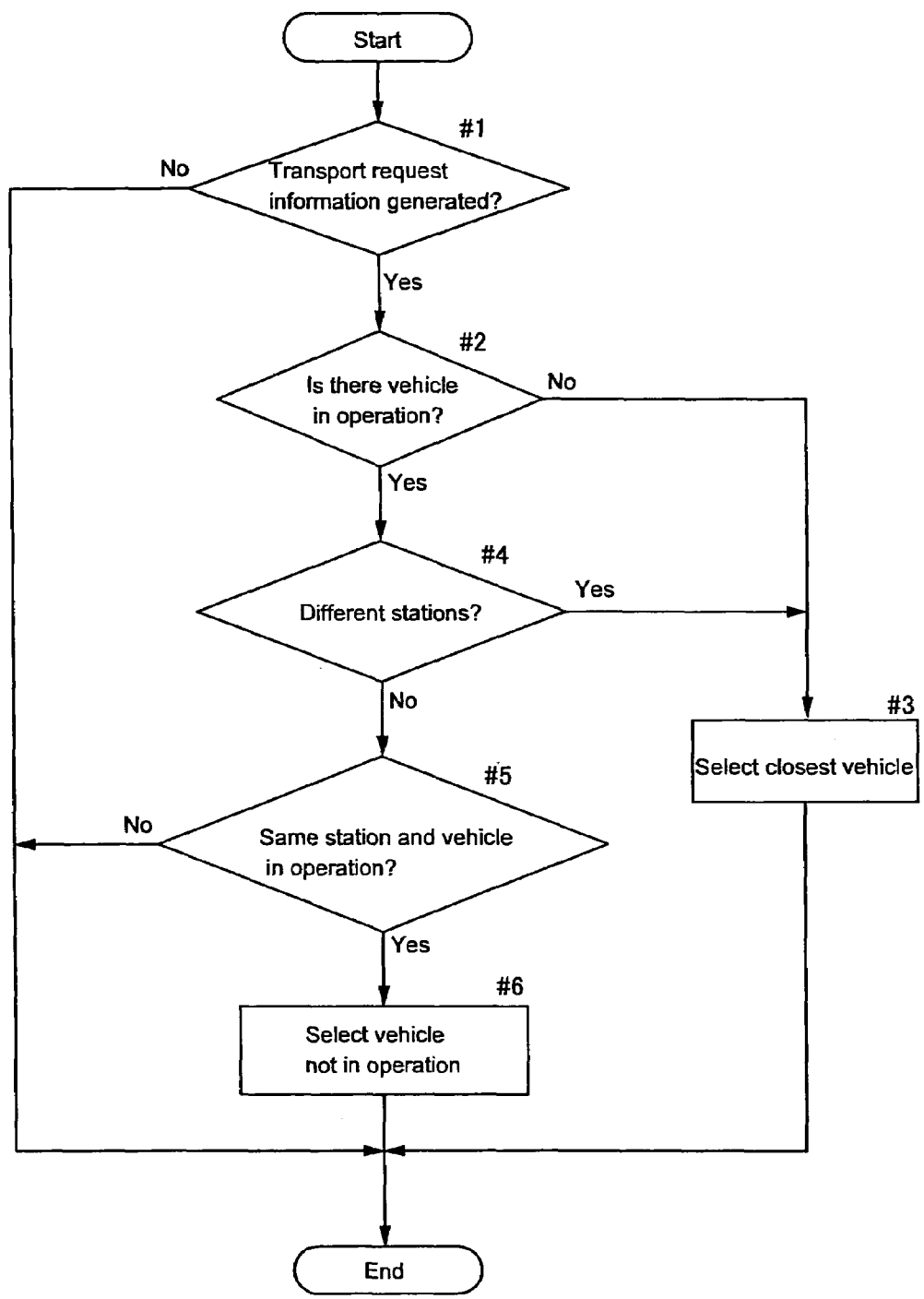
FIG. 6 is a flowchart showing the operation of a ground-side controller in a selection process.

The operation of the ground-side controller 14 in the selection process will be described with reference to the flowchart in FIG. 6.

When transport request data are processed at a time when there are no article handling vehicles 3 currently performing a transport operation, the ground-side controller 14 selects the article handling vehicle 3, of the first article handling vehicle 3a and the second article handling vehicle 3b, that is located closer to the station for collection as the article handling vehicle 3 for the transport operation (steps 1 to 3).

If the station for collection according to the current transport request data that have been processed is different from the station for collection according to the transport request data previously processed, then the ground-side controller 14 selects the article handling vehicle 3, of the first article handling vehicle 3a and the second article handling vehicle 3b, that is located closer to the station for collection as the article handling vehicle 3 for the transport operation (steps 4 and 3).

If the station for collection according to the transport request data currently processed is the same as that according to the transport request data previously processed, and the article handling vehicle 3 that was selected based on the transport request data previously processed is currently performing a transport operation, then the ground-side controller 14 selects the remaining article handling vehicle 3, which is not currently performing a transport operation, as the article handling vehicle 3 for the transport operation (steps 5 and 6).

As an example, the following describes a case in which in the selection process, the first article handling vehicle 3a is selected as the article handling vehicle 3 for the transport operation and the transport operation is performed using the first article handling vehicle 3a.

Each time a set period passes, the ground-side controller 14 transmits run command information such as a run start command and speed command information to the travel inverter unit 7 of the first article handling vehicle 3a via a communication network such as the first optical transmission device 16.

The travel inverter unit 7 of the first article handling vehicle 3a is configured so that it movingly drives the first article handling vehicle 3a while adjusting its running speed, by adjusting the current to the travel motor 6 based on the run command information from the ground-side controller 14.

Further, since the information detected by the position detection sensors 15 is input into the ground-side controller 14, the ground-side controller 14 is configured so as to movingly drive the first article handling vehicle 3a while controlling the run position of the first article handling vehicle 3a.

When the run position of the first article handling vehicle 3a reaches a target stopping position corresponding to the station for collection 1 or the station for delivery 1 at a time when the ground-side controller 14 is movingly driving the first article handling vehicle 3a while controlling its run position in this manner, the ground-side controller 14 sends stop command information to the travel inverter unit 7 of the first article handling vehicle 3a over a communication network such as the first optical transmission device 16.

The travel inverter unit 7 of the first article handling vehicle 3a stops the first article handling vehicle 3a at the target stopping position in accordance with the stop command information from the ground-side controller 14.

When the first article handling vehicle 3a has stopped at the target stopping position, the ground-side controller 14 sends transfer command information to the transfer inverter 11 of the first article handling vehicle 3a via a communication network such as the first optical transmission device 16.

The transfer inverter 11 of the first article handling vehicle 3a is configured so that based on the transfer command information from the ground-side controller 14, it activates the transfer device 4 to retrieve the article 20 in the station for collection 1 or to deliver the article 20 to the station for delivery 1.

The input-output device 13 transmits the information detected by the sensors 12 to the ground-side controller 14 via a communication network such as the first optical transmission device 16, and from the information from the input-output device 13, the ground-side controller 14 recognizes that the transport operation has been finished.

As described above, the ground-side controller 14 performs the transport operation using the article handling vehicle 3 that is selected through the selection process, but when performing a transport operation using the article handling vehicle 3 for transport, if there is an article handling vehicle 3 that is currently performing a transport operation, the ground-side controller 14 moves the article handling vehicle 3 for the transport operation so that it does not interfere with article handling vehicle 3 that is currently performing the transport operation.

More specifically, the configuration of the ground-side controller 14 is such that it determines whether or not the article handling vehicle 3 that is currently performing the transport operation and the article handling vehicle 3 for the transport operation will interfere with one another, based on the run range of the article handling vehicle 3 currently performing the transport operation and the running range of the article handling vehicle 3 for the transport operation.

It should be noted that the run ranges are found from the current positions of the stations for collection 1, the stations for delivery 1, and the article handling vehicles 3.

The ground-side controller 14 is configured such that when the article handling vehicle 3 currently performing the transport operation and the article handling vehicle 3 for the transport operation do not interfere with each other, it moves the article handling vehicle 3 for the transport operation to the station for collection 1 in order to perform the transport operation.

When the article handling vehicle 3 currently performing the transport operation and the article handling vehicle 3 for a transport operation interfere with each other, the ground-side controller 14 keeps the article handling vehicle 3 for the transport operation on standby at its current position until the article handling vehicle 3 currently performing the transport operation finishes its transport operation, or moves the article handling vehicle 3 for the transport operation to a position at which it does not interfere with the article handling vehicle 3 that is currently performing the transport operation.

When the article handling vehicle 3 currently performing the transport operation ends the transport operation at a time when the article handling vehicle 3 for the transport operation is on standby at its current position or the article handling vehicle 3 for the transport operation has been moved to a position at which it does not interfere with the article handling vehicle 3 currently performing the transport operation, then the ground-side controller 14 moves the article handling vehicle 3 that has finished the transport operation to a position at which it does not interfere with the article handling vehicle 3 for the transport operation, and moves the article handling vehicle 3 for the transport operation to the station for collection 1 in order to perform the transport operation.

Further, if one of the article handling vehicles 3 is performing a transport operation, then the ground-side controller 14 determines whether or not the article handling vehicle 3 that is not currently performing the transport operation will interfere with the article handling vehicle 3 that is performing the transport operation, and if it determines that there will be interference, then the ground-side controller 14 moves the article handling vehicle 3 that is not performing the transport operation to a position at which it will not interfere with the article handling vehicle 3 that is performing the transport operation.

By providing the first article handling vehicle 3a and the second article handling vehicle 3b with vehicle distance sensors 8 and slave controllers 10 that are independent of the ground-side controller 14, the two are kept from colliding with one another even if there is a risk that the article handling vehicles 3 will accidentally collide due to inappropriate control by the ground-side controller 14.

Specifically, the slave controllers 10 are configured so as to monitor the relative distance between, and the relative speeds of, the article handling vehicles 3 based on the information detected by the vehicle distance sensors 8, and if there is a potential for the article handling vehicles 3 to collide, the slave controllers 10 forcibly stop movement of the article handling vehicles 3.

That is to say, if the relative distance between vehicles is equal to or less than an allowable distance between vehicles, or if the relative speed is equal to or greater than an allowable relative speed, then the slave controllers 10 stop movement of the article handling vehicles 3 by activating power stopping means 18 for stopping the supply of power to the travel motors 6 in order to stop the supply of power to the travel motors 6.

The slave controllers 10 are configured such that the slave controller 10 on one article handling vehicle 3 sends stop command information to the slave controller 10 on the other article handling vehicle 3 in order to stop the article handling vehicle 3, through the vehicle-to-vehicle optical transmission device 9, and then the slave controller 10 that receives that stop command information activates the power stopping means 18 to stop the supply of electric power to the travel motor 6, and thus stops movement of the article handling vehicle 3.

OTHER EMBODIMENTS (1) In the aforementioned embodiment, the ground-side controller 14 is configured to control the positions of the plurality of article handling vehicles 3 on the path 2 based on information detected by the position detection sensors 15. However, as another possibility, each article handling vehicle 3 can be provided with an encoder, and by communicating the information detected by the encoders to the ground-side controller 14 via the input-output devices 13, the ground-side controller 14 can control the positions of the plurality of article handling vehicles 3 on the path 2.

(2) In the aforementioned embodiment, the layout shown in FIG. 1 is used as an example of the positions where the stations 1 are disposed. However, other layouts can be also adopted, and the number of the stations 1 and the positions at which the stations 1 are arranged can be suitably changed.

(3) The aforementioned embodiment illustratively showed an example in which the two article handling vehicles 3 are each provided with a vehicle distance sensor 8 and a slave controller 10. However, it is also possible to adopt a configuration in which the vehicle distance sensor 8 and the slave controller 10 are provided in only one of the two article handling vehicles 3, and if the relative distance between vehicles is equal to or greater than an allowable distance between vehicles or if the relative speed is equal to or greater than an allowable relative speed, thus creating the possibility of a collision, then the one article handling vehicle 3, through the vehicle-to-vehicle optical transmission device 9, notifies the other article handling vehicle 3 that there is a possibility of a collision, and the other article handling vehicle 3 is stopped in accordance with that communication.

(4) The aforementioned embodiment illustratively describes an example in which two article handling vehicles 3 are provided, but the number of article handling vehicles 3 can be changed as appropriate.

(5) In the aforementioned embodiment, the article handling vehicles 3 serve as examples of article transporting vehicles, but it is also possible to use article transporting vehicles other than the article handling vehicles 3, and for example it is also possible to employ stacker cranes that run back and forth along a path between a pair of article storage racks.

What is claimed is:

1. An article transport apparatus, comprising:
a path that has a first end and a second end and that extends along a plurality of article transferring locations;
a plurality of article transporting vehicles that run on the path; and
control means for controlling the plurality of article transporting vehicles;
wherein based on transport request data which specifies an article transferring location for collecting and an article transferring location for delivering from among the plurality of article transferring locations, said control means executes a basic control scheme by selecting an article transporting vehicle closest to said specified article transferring location for collecting as an article transporting vehicle for a transport operation and causing the selected article transporting vehicle to run on the path to the specified article transferring location for collecting and the specified article transferring location for delivering; and
wherein in a case when transport request data specifying a same article transferring location for collecting is issued in repetition and an article transporting vehicle selected based on previously processed transport request data is currently engaged in its transport operation, said control means executes an empty vehicle transport control scheme by selecting a further article transporting vehicle than said article transporting vehicle selected based on the previously processed transport request data, as an article for a transport operation and causing said both article transporting vehicles to perform the respective transport operations.

2. The article transport apparatus according to claim 1,
wherein there are two article transporting vehicles;
wherein when the transport request data currently processed and transport request data previously processed specify different article transferring locations for collecting, or when transport request data are processed at a time when no article transporting vehicle is currently performing a transport operation, then the control means selects the article transporting vehicle, of the two article transporting vehicles, that is positioned closer to the article transferring location for collecting as the article transporting vehicle for a transport operation; and
wherein when transport request data currently processed and transport request data previously processed specify a same article transferring location for collecting, and the article transporting vehicle that was selected based on the transport request data previously processed is currently performing a transport operation, then the control means selects the remaining article transporting vehicle that is not currently performing a transport operation as the article transporting vehicle for the transport operation.

3. The article transport apparatus according to claim 1,
wherein the plurality of article transferring locations include a reception article transferring location for receiving an article from outside, a shipping article transferring location for shipping an article to the outside, a stocking article transferring location for stocking an article into an automated storage facility, and a delivery article transferring location for delivering an article from the automated storage facility.

4. The article transport apparatus according to claim 1 further comprising:
a position sensor for obtaining information necessary to determine positions of one or more of the article transporting vehicles, and
wherein the control means is fixed with respect to the ground and stores a mapping information necessary to determine positions of the article transporting vehicles based on signals from the position sensor.

5. The article transport apparatus according to claim 1
wherein each of the article transporting vehicles has a vehicle distance sensor and a slave controller which stores an algorithm designed to avoid collision with one or more of the vehicles based on the signals from the distance sensor.

6. The article transport apparatus according to claim 5
wherein each of the article transporting vehicles has an inverter unit having an inverter controller which is separate from the slave controller, and wherein a control signal from the control means is received by the inverter controller.

7. The article transport apparatus according to claim 1 wherein the path is straight between the first end and the second end.

8. An article transport apparatus, comprising:
a path that has a first end and a second end and that extends along a plurality of article transferring locations;
a plurality of article transporting vehicles that run on the path, the path being configured such that the plurality of article transporting vehicles can access the plurality of article transporting locations without departing from the path; and
control means for controlling the plurality of article transporting vehicles;
wherein said control means is configured to cause each one of the plurality of article transporting vehicles to move in a first direction on the path and in a second direction opposite from the first direction on the path;

wherein based on transport request data which specifies an article transferring location for collecting and an article transferring location for delivering from among the plurality of article transferring locations, said control means executes a basic control scheme by selecting an article transporting vehicle closest to said specified article transferring location for collecting as an article transporting vehicle for a transport operation and causing the selected article transporting vehicle to run on the path to the specified article transferring location for collecting and to the specified article transferring location for delivering; and wherein in a case when transport request data specifying a same article transferring location for collecting is issued in repetition and an article transporting vehicle selected based on previously processed transport request data is currently engaged in its transport operation, said control means executes an empty vehicle transport control scheme by selecting a further article transporting vehicle than said article transporting vehicle selected based on the previously processed transport request data, as an article for a transport operation and causing said both article transporting vehicles to perform the respective transport operations.

9. The article transport apparatus according to claim 8, wherein there are two article transporting vehicles;

wherein when the transport request data currently processed and transport request data previously processed specify different article transferring locations for collecting, or when transport request data are processed at a time when no article transporting vehicle is currently performing a transport operation, then the control means selects the article transporting vehicle, of the two article transporting vehicles, that is positioned closer to the article transferring location for collecting as the article transporting vehicle for a transport operation; and wherein when transport request data currently processed and transport request data previously processed specify a same article transferring location for collecting, and the article transporting vehicle that was selected based on the transport request data previously processed is currently performing a transport operation, then the control means selects the remaining article transporting vehicle that is not currently performing a transport operation as the article transporting vehicle for the transport operation.

10. The article transport apparatus according to claim 8, wherein the plurality of article transferring locations include a reception article transferring location for receiving an article from outside, a shipping article transferring location for shipping an article to the outside, a stocking article transferring location for stocking an article into an automated storage facility, and a delivery article transferring location for delivering an article from the automated storage facility.

11. The article transport apparatus according to claim 8 further comprising:

a position sensor for obtaining information necessary to determine positions of one or more of the article transporting vehicles, and wherein the control means is fixed with respect to the ground and stores a mapping information necessary to determine positions of the article transporting vehicles based on signals from the position sensor.

12. The article transport apparatus according to claim 8 wherein each of the article transporting vehicles has a vehicle distance sensor and a slave controller which stores an algorithm designed to avoid collision with one or more of the vehicles based on the signals from the distance sensor.

13. The article transport apparatus according to claim 12 wherein each of the article transporting vehicles has an inverter unit having an inverter controller which is separate from the slave controller, and wherein a control signal from the control means is received by the inverter controller.

14. The article transport apparatus according to claim 8 wherein the path is straight between the first end and the second end.

15. The article transport apparatus according to claim 1, wherein each of the first and second ends of the path defines a terminal end beyond which none of the plurality of article transport vehicles are allowed to travel.

16. The article transport apparatus according to claim 8, wherein each of the first and second ends of the path defines a terminal end beyond which none of the plurality of article transport vehicles are allowed to travel.

* * * * *